United States Patent [19]

Vertanen

[11] Patent Number: 5,165,445
[45] Date of Patent: Nov. 24, 1992

[54] RELIEF VENT APPARATUS

[75] Inventor: Mark W. Vertanen, Creston, Iowa

[73] Assignee: Gits Manufacturing Company, Creston, Iowa

[21] Appl. No.: 748,003

[22] Filed: Aug. 21, 1991

[51] Int. Cl.⁵ ............................................. F16K 17/196
[52] U.S. Cl. .................................. 137/493.6; 137/493.9
[58] Field of Search ................ 137/493.1, 493.6, 493.9

[56] References Cited

U.S. PATENT DOCUMENTS

| | | | |
|---|---|---|---|
| 3,568,695 | 3/1971 | De Frees | 137/493.6 X |
| 4,125,126 | 11/1978 | Davis | 137/493.1 |
| 5,002,088 | 3/1991 | Engelhardt et al. | 137/493.1 |

Primary Examiner—Stephen M. Hepperle
Attorney, Agent, or Firm—Haverstock, Garrett & Roberts

[57] ABSTRACT

A combination pressure and vacuum relief vent apparatus which accurately and reliably provides both high flow rates of pressure relief and negative pressure or vacuum relief in a container, the apparatus comprising a base member having a passageway extending between opposite ends thereof, one end of which base member can be mounted on or over an orifice on a container, a shaft member located in the passageway of the base member and a combination valve assembly mounted on the shaft member adjacent to the opposite or free end of the body member, which combination valve assembly opens to provide high flow rates of pressure relief at a precise predetermined first set pressure and closes when the pressure falls below substantially the same or a lower set value and which combination valve assembly includes a vacuum valve member which moves along the shaft member away from the combination valve assembly in response to the pressure in the container decreasing or falling below a second predetermined pressure condition to allow ambient air to enter the container therebetween, and a seal member located on the shaft member adjacent to the vacuum valve member which forms a seal therebetween.

13 Claims, 2 Drawing Sheets

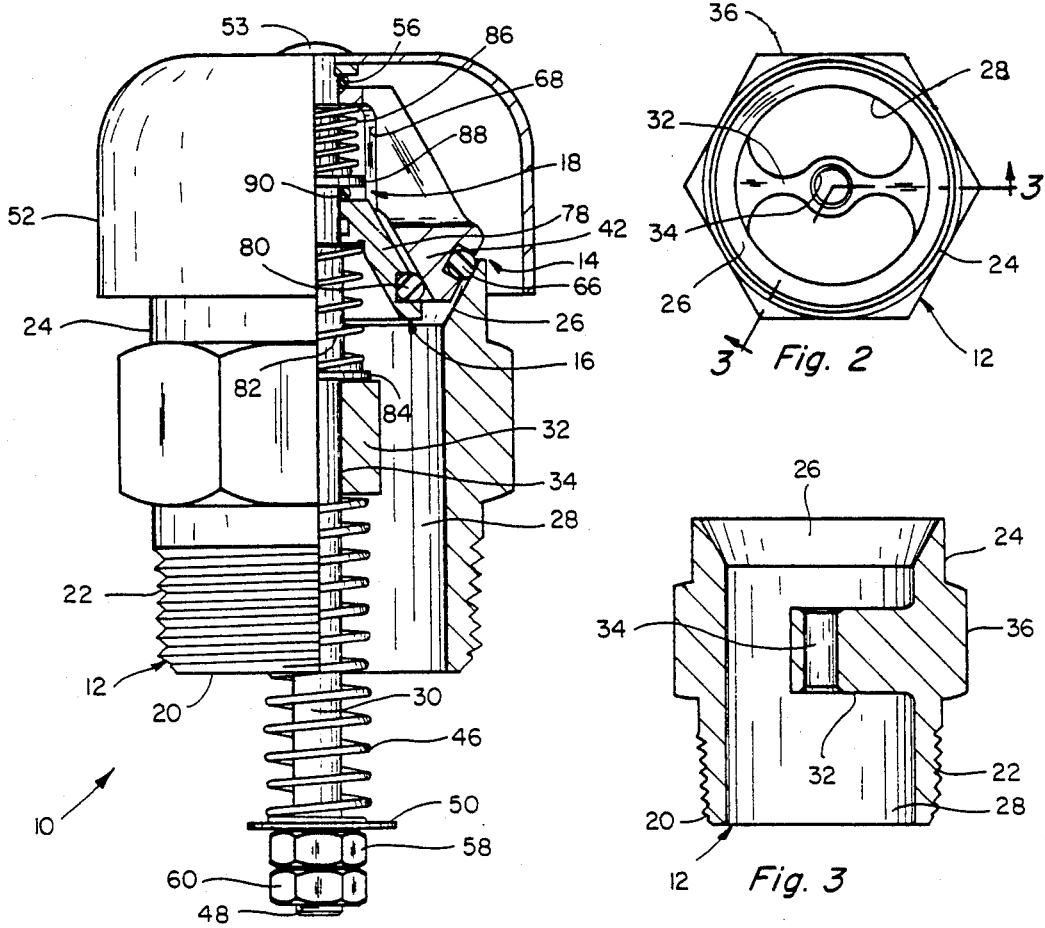
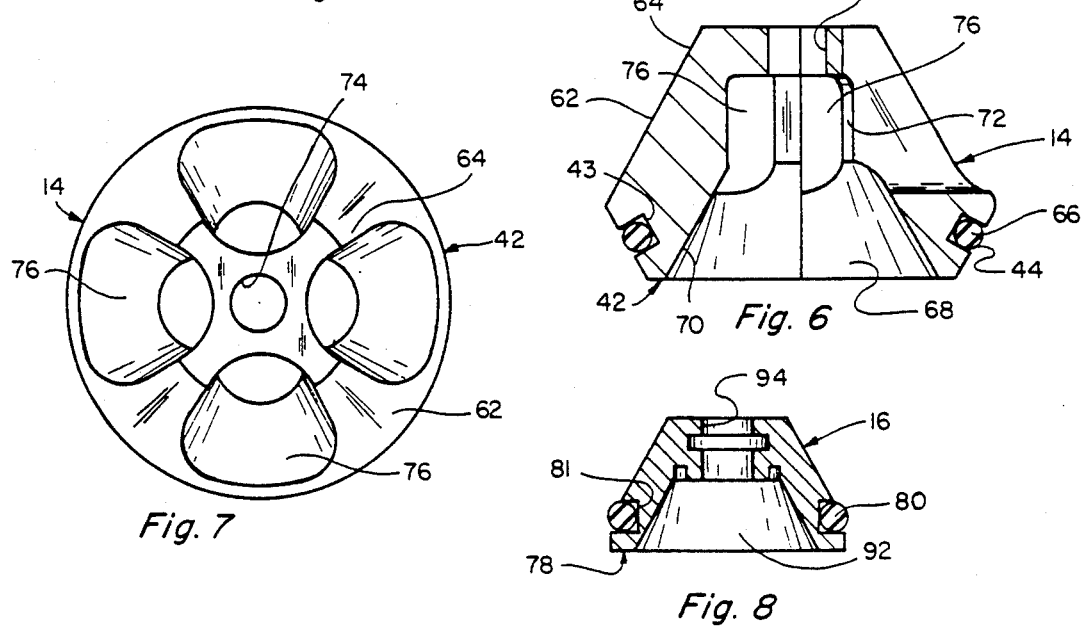

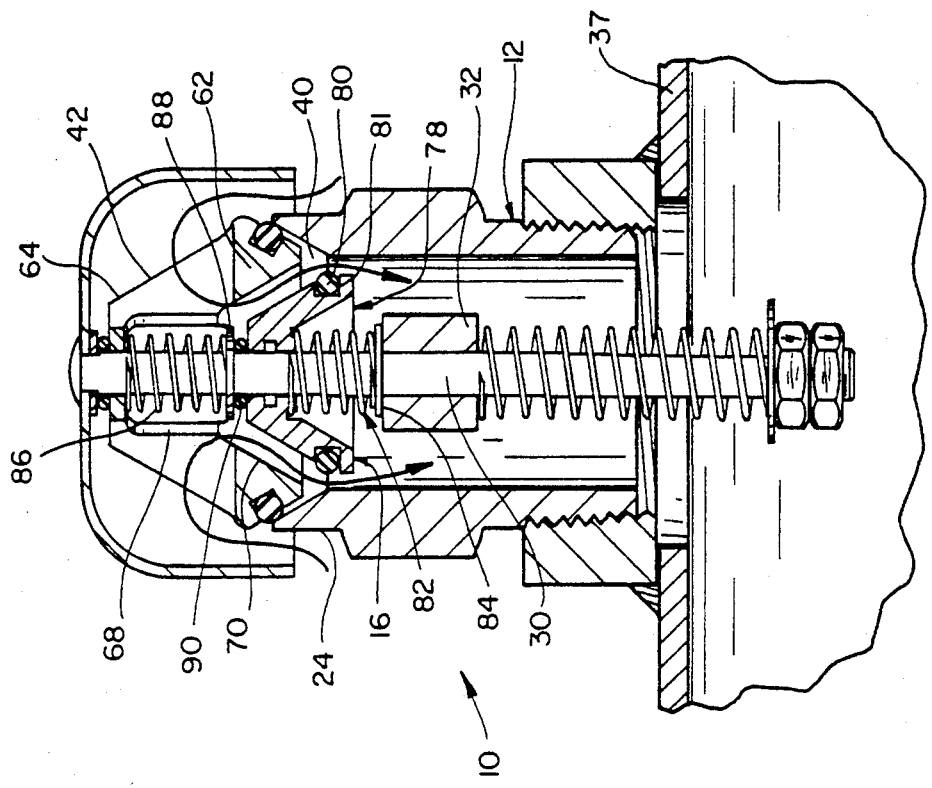
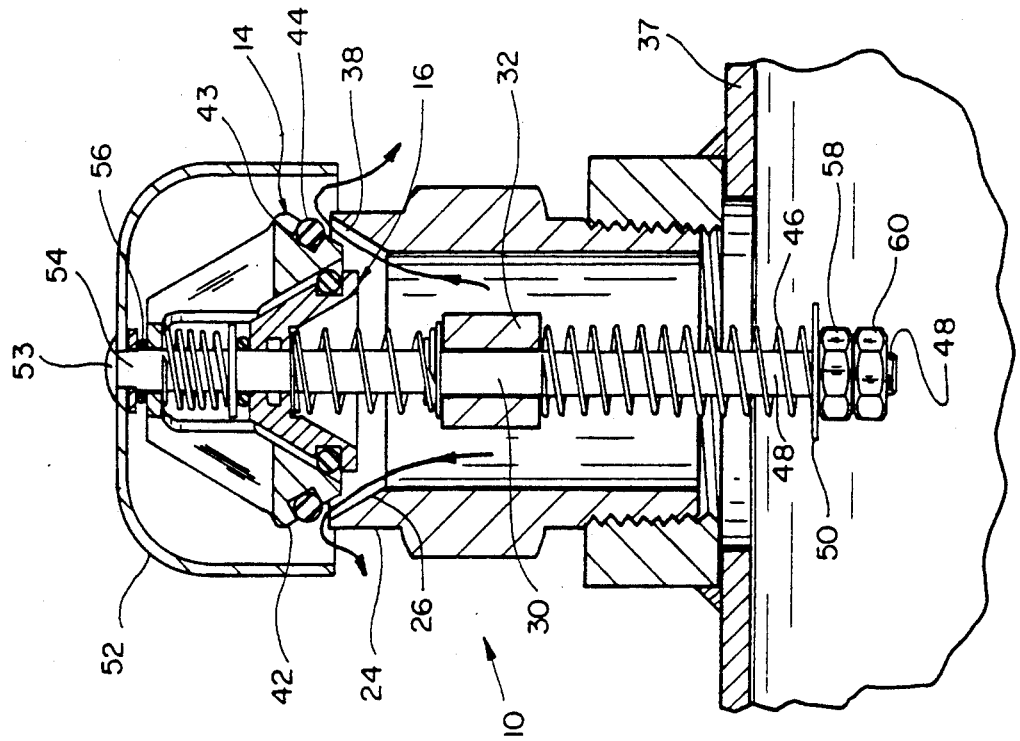

RELIEF VENT APPARATUS

The present invention relates generally to relief vent devices for storage and cargo containers and the like, and more particularly, to a combination pressure and vacuum relief vent device which accurately and reliably provides both high flow rates of pressure relief and negative pressure or vacuum relief in a container, all through a single port on the container. The present combination or two-in-one pressure and vacuum relief vent device is a self actuating and modulating device which can be made to be about the size of a conventional pressure or vacuum relief valve alone. The present device opens to provide high flow rates for pressure relief at a precise set pressure and closes when the pressure falls below substantially the same or a lower set value. Vacuum relief is provided at a predetermined or set negative pressure or vacuum condition and allows a relatively high flow rate of make up air to enter a container which importantly can be sufficient for preventing collapse or implosion of the container during such operations as the transfer or storage of product or material including during filling and emptying. The present device also includes seal means which are movable with the vacuum relief means as they open and close to maintain an airtight seal around a shaft member of the device to increase the accuracy and reliability of operation and also to reduce contamination which can impair the operation of the device. The present relief vent device is suitable for use on a variety of containers for storage, materials handling and cargo applications for a variety of materials and substances, is leak resistant for use in shipping and transportation applications and can be fabricated from stainless steel and other materials for use in corrosive and other harmful environments.

BACKGROUND OF THE INVENTION

Numerous devices for venting and relieving excess pressure and vacuum conditions in containers such as storage tanks and the like are well known in the art. Among the known devices are separate pressure relief valves and vacuum vent devices which can be individually selected and installed in separate openings in a container to meet pressure relief and vacuum make up air requirements. A limitation of using separate pressure and vacuum relief devices is that either two orifices must be available on the container device for mounting the separate vent devices, or a manifold or Y-shaped adapter for mounting both devices in a single container orifice must be used. Other known devices that combine pressure and vacuum relief are also known in the art. Such devices, however, suffer from various limitations including providing flow rates of make up air for vacuum relief which are insufficient to compensate for the conditions produced when using relatively large and powerful pumps to remove products from a container to prevent the collapse or implosion of the container.

Another combined pressure and vacuum relief vent construction includes seal means between the vacuum relief means and a central shaft portion thereof, which seal means can leak and fail so as to prevent the accurate and reliable operation of the device at precise pressure and vacuum conditions. An alternative is to open the fill or access cover of a storage container during removal or filling of product to relieve the undesirable pressure condition. Limitations of this procedure are exposure of the contents of the container to contamination from the surrounding environment, exposure of the personnel to the contents, and also the danger of failure to replace the cover when the filling and emptying operation is complete. Contrasted to the relatively limited devices and alternatives discussed above, the subject invention relates to a rather uncomplicated, precise and reliable combination vent device for relieving excessive pressure and vacuum conditions in a storage or like container.

SUMMARY OF THE INVENTION

The present invention overcomes many of the shortcomings and limitations associated with known pressure relief vent devices and alternatives and teaches the construction and operation of a combination or a two-in-one relief vent device which is self-actuating and modulating to accurately vent both excessive positive pressures and negative pressures or vacuum conditions through a single orifice or port on a storage tank, a cargo tank or other container. The present device closes the orifice to prevent communication between the interior of the container and atmospheric or environmental conditions when the pressure condition in the container is less than a first predetermined or set pressure and greater than a second predetermined or set lower or negative pressure or partial vacuum condition. The present device opens to provide pressure relief when the internal container pressure is equal to or greater than the first predetermined pressure and closes when the internal container pressure returns to or is less than the predetermined pressure. Below the predetermined vacuum condition, the device opens to allow a relatively high flow rate of make up air to enter the container, the make up air flow rate which is possible through the device being sufficient to prevent collapse or implosion of the container, and closes when the excessive vacuum condition has been alleviated. The present combination relief vent device additionally remains closed when the container on which it is installed is tipped or overturned. The present device can provide pressure and vacuum relief in response to numerous conditions including pressure changes in a container resulting from the inflow and outflow of material and product and due to extremes in environmental or atmospheric condition and due to internal changes in temperature and pressure of the contents and the like.

The present device comprises a body member which can be mounted on or in an orifice or port on a container, pressure relief means comprising a pressure relief valve assembly which includes a cover member which enhances the modulation thereof and vacuum relief means comprising a vacuum relief valve assembly which importantly includes seal means associated therewith which enhance the ability of the device to be controlled accurately and reliably to provide relief from all possible conditions. The body member of the present device is a tubular shaped member having a passage extending therethrough between opposite first and second end portions thereof. The body member preferably includes means for mounting the device on a container adjacent to one end portion thereof and has a valve seat adjacent to the opposite or free end portion thereof. The body member provides a conduit for communicating pressure conditions from the inside of a container to the pressure and vacuum relief valve assemblies, and also for the outflow and inflow of air and other gases and the like therethrough.

The pressure relief valve assembly comprises a movable pressure valve member having seal means associated therewith which are preferably cooperatively and sealably engageable with the valve seat portion of the body member to form an airtight seal therebetween when pressure conditions inside of a container are below the first predetermined or set pressure. The pressure valve member is urged or biased toward the valve seat by biasing means preferably comprising a pressure valve spring, the pressure valve member being deflected or displaced from the valve seat when internal pressure conditions of a container exert a force against the pressure valve member which counteracts and exceeds the force of the pressure valve spring in the usual manner.

The force produced by the pressure valve spring is determined by the characteristics of the spring including the spring constant or spring rate which is the ratio of force to deflection thereof. For example, the higher the spring constant the greater will be the force required to counteract the spring and the less will be the movement or deflection of the pressure valve member for a given pressure value, the counteracting force of the pressure being determined by the product of the pressure and the surface area of the valve member exposed thereto. Also, in the present construction when the pressure relief valve opens the escaping air impinges on the cover member which extends over the device in such a manner as to augment the force exerted against the pressure valve member so as to increase the displacement or deflection thereof for a given pressure value. The increased displacement of the pressure valve member provides a relatively large passage or pressure relief vent area or flow path for the outflow or escape of the contents or gas in the container. A relatively high spring constant also provides a stronger closing force which enables the pressure valve to close sooner and more accurately at a predetermined set pressure which can be accurately predetermined and may be substantially the same or a different value than the opening pressure value. Another feature of the pressure relief valve assembly is the provision of an internal cavity in the pressure valve member which cooperatively and sealably receives the vacuum relief valve assembly and provides a relatively large passageway through the pressure valve assembly for the inflow of makeup air through the device, as discussed below. The present device is self-modulating for both pressure and vacuum relief, the pressure valve member deflecting proportional amount for a particular pressure value and the vacuum relief valve assembly opening by a proportional amount for a particular vacuum or negative pressure.

The vacuum relief valve assembly comprises a movable vacuum valve member having seal means associated therewith which are preferably cooperatively and sealably engageable with a valve seat on the pressure valve member to form an airtight seal therebetween when pressure conditions inside of a container are above the second predetermined or set pressure. The second predetermined pressure can be a vacuum condition or a negative pressure condition in the container defined as a pressure condition which is lower than the pressure condition on the exterior of the container. The vacuum valve member is urged or biased toward the valve seat by biasing means preferably comprising a vacuum valve spring, the vacuum valve member being deflected or displaced from the valve seat when a predetermined vacuum or negative pressure condition is present in the container.

In the preferred construction the vacuum relief valve member is cooperatively receivable in an opening to the internal cavity of the pressure valve member so as to close the opening when pressure conditions are above the second predetermined pressure. In this position, the vacuum valve member provides an airtight seal around the opening to the cavity and passage through the pressure valve member, and also provides a surface area against which internal pressure conditions act to open the pressure valve assembly. When pressure conditions reach or are less than the second predetermined pressure, the vacuum relief valve assembly modulates such that for a particular pressure condition the vacuum valve member is deflected or displaced from the pressure valve member sufficiently to provide a relatively large passageway therebetween for the inflow of makeup air to the container. The space between the vacuum valve member and the pressure valve member and the conduit through the pressure valve member are each large enough to enable a relatively high flow rate of make-up air therethrough which is sufficient to prevent collapse or implosion of the container when material or product is pumped out or otherwise removed therefrom. The ability of the vacuum valve member to be cooperatively received by the pressure valve member makes for a combination of the two valve assemblies in a single structure of a size that is about the same as the size of either a pressure or vacuum relief devices separately.

Another important feature of the vacuum relief valve portion of the subject construction is in seal means located on the shaft member which extends through the vacuum valve member. The seal provides an airtight seal between the vacuum valve member and the shaft member as the vacuum valve member moves to open and close. The seal includes another spring which urges or biases a seal member such as an O-ring seal toward the vacuum valve member as it is displaced or deflected. This spring preferably acts in opposition to the first vacuum valve spring but is a weaker spring so as to prevent hysteresis which is the lagging of the movement of the vacuum valve member when the forces acting thereagainst have changed. However, this added seal importantly prevents air leakage between the vacuum valve member and the shaft member as such enable much more precise and accurate adjustments of the operating pressure of the present device. The seal also helps to prevent contaminates from passing therebetween which could foul or interfere with the operation of the device.

The present combination relief vent device can be adapted for use with a variety of mobile and stationary container devices of almost any size and shape such as drums, tanks, vessels, kettles and like devices used for holding, storing and transporting a variety of products and materials including chemicals, petroleum products, food and agricultural products and the like. The present device can also be constructed from a variety of materials including stainless steel and other corrosion resistent materials, certain plastics, poly vinyl chlorides and any other suitable materials. The present device can further be adapted for providing pressure and vacuum relief at desired pressure and vacuum conditions to comply with industry and government standards and the like.

OBJECTS OF THE INVENTION

It is a principal object of the present invention to provide both pressure relief and vacuum relief for a container by a single vent structure at one location on the container.

Another object is to provide a combination pressure and vacuum relief device which is of simple construction and can be made in a size similar to either of the included relief devices by itself.

Another object is to provide a relief vent device which remains closed below a first predetermined internal pressure and above a second predetermined internal pressure.

Another object is to provide a pressure relief device which has one portion that opens when the pressure in a container reaches or exceeds some precise predetermined pressure and has a second portion which opens when the pressure in the container reaches or falls below a second predetermined lower pressure or vacuum condition.

Another object is to provide a vacuum relief device which opens to provide a sufficient flow passage to prevent collapse or implosion of a container on which it is installed due to environmental extremes and when material or product is removed therefrom.

Another object is to provide a pressure and vacuum relief device which maintains an airtight sealed condition between certain portions of the device in all conditions of the device.

Another object is to provide a combination excess pressure and vacuum relief device which is relatively simple and inexpensive to manufacture, install and operate and which is adaptable for use with a variety of chemical and other material handling devices or containers including stationary and mobile containers.

Another object is to provide a combination pressure and vacuum relief device which can be configured to meet industry and government standards for both pressure and vacuum relief.

Another object is to provide a combination pressure and vacuum relief device which can be used with many different kinds of materials including corrosive materials and in corrosive environments.

These and other objects and advantages of the present invention will become apparent to those skilled in the art after considering the following detailed specification in conjunction with the accompanying drawings wherein:

BRIEF DESCRIPTION OF THE DRAWINGS

FIG. 1 is a partial cross-sectional side elevational view of a combination pressure and vacuum relief vent apparatus constructed according to the teachings of the present invention;

FIG. 2 is a top plan view of the tubular body portion of the device shown in FIG. 1;

FIG. 3 is a cross-sectional view taken along lines 3—3 of FIG. 2;

FIG. 4 is a cross-sectional side elevational view of the apparatus of FIG. 1 shown mounted on a container and shown in the pressure relief mode;

FIG. 5 is a cross-sectional side elevational view of the apparatus of FIG. 1 shown mounted on a container and shown in the vacuum relief mode;

FIG. 6 is a cross-sectional side elevational view of the pressure valve member of the apparatus in FIGS. 1-5;

FIG. 7 is a top plan view of the pressure valve member of FIG. 6; and

FIG. 8 is a cross-sectional side elevational view of the vacuum valve member employed in the apparatus of FIGS. 1-5.

DESCRIPTION OF THE PREFERRED EMBODIMENT

Referring to the drawings more particularly by reference numbers wherein like numerals refer to like parts, number 10 in FIG. 1 refers to a relief device for use on containers constructed according to the teachings of the present invention. The device 10 is a combination or two-in-one device which can relieve over pressure conditions in a container at or above some selected first pressure and can relieve excessive negative pressure or vacuum condition that may exist. The device is especially designed to be installed on a container such as a storage tank, a bulk shipping container, a drum or in any other stationary or mobile container wherein the internal pressure and vacuum conditions can vary due to the transfer of product or material into or out of the container or from changes in internal and environmental or atmospheric conditions and the like. The present device 10 includes a tubular body member 12, a pressure relief valve assembly 14, a vacuum relief valve assembly 16 and seal means 18 associated with the vacuum relief valve assembly 16.

The body member 12 is of a tubular construction and is preferably fabricated of stainless steel or some other corrosion resistant material. The member 12 has a pair of opposite end portions including a first end portion 20 having thread means 22 for mounting device 10 on a container and an opposite second or free end portion 24 which forms a pressure valve seat 26 preferably having a tapered annular shape, as shown in FIGS. 1, 2 and 3. An open ended passage 28 having a centrally located longitudinal axis extends between the first and second end portions 20 and 24, the passage 28 providing a conduit for communicating the pressure conditions inside of a container to the pressure relief and vacuum relief valve assemblies 14 and 16 and also for the flow of air and the like into and out of the container. A shaft member 30 is centrally located in the passage 28, the body member 12 including a shaft support or web portion 32 extending into the passage 28 intermediate to the first and second end portions 20 and 24. The shaft support portion 32 has a web-like constructions so as to not significantly impede or reduce flow through passage 28 in the body member 12 and a longitudinal bore 34 extends through the portion 32 to slidably receive the shaft member 30. A hexagonally shaped surface 36 extends around an intermediate portion of the exterior of the body member 12 for cooperatively receiving a wrench or other tool used for attaching and removing the device 10 from a container.

The pressure relief valve assembly 14 and vacuum relief valve assembly 16 are located adjacent to the second or free end portion 24 of the body member 12. When both the pressure valve assembly 14 and the vacuum valve assembly 16 are closed (as shown in FIG. 1) the device 10 is sealed air-tight preventing both the outflow or escape of the contents from the container and also the inflow of make up air into the container. When the present device is mounted on a container such as container 37 shown in FIGS. 4 and 5 and the pressure condition therein reaches or exceed a first predetermined threshold or set value, the pressure relief valve assembly 14 will move away from the seat 26 to open a pressure relief vent or passageway 38 as shown in FIG. 4 through which the contents of the container such as gas or vapor can escape. For vacuum relief, which occurs when the pressure inside the container 37 is less than the ambient outside pressure by at least some predetermined amount the vacuum relief valve assembly 16 will move inwardly away from the valve assembly 14 to open a vacuum relief vent passage 40 as shown in FIG. 5.

The pressure relief valve assembly 14 includes a valve member 42 which is mounted on the shaft member 30 and movable therewith axially relative to the valve seat 26 on the second end portion 24 of the body member 12. The pressure valve member 42 includes seal means or member 44 positioned in an annular groove 43 in the member or assembly 14 for cooperatively and sealably engaging the seat surface 26 on the body member 12. The pressure valve member 42 is biased into engagement with the pressure valve seat 26 by a pressure valve spring 46 located on the shaft member 30 between the shaft support 32 and a washer 50. A cover member 52 is peened as at 53 or otherwise rigidly attached to the end portion 54 of the shaft member 30 and encloses valve assemblies 14 and 16, being separated from the central portion of the valve member 42 by an O-ring 56 located around the shaft member 30 as shown. The cover member 52 is cup shaped and is closed at one end. The cover member 52 extends to cover and enclose the pressure relief vent 38 such that air escaping through the vent 38 impinges on and is deflected by the cover member 52. This tends to augment the forces acting to lift or displace the pressure valve member 42, as discussed below. A compression nut 58 is threadedly attached to the first threaded end portion 48 of the shaft member 30 adjacent to the washer 50 and can be tightened as desired to compress the pressure valve spring 46. Compressing the spring 46 draws and biases the cover member 52 against the pressure valve member 42 thereby biasing the pressure valve member 42 toward the pressure valve seat 26 to sealably engage the pressure seal means 44 with the pressure valve seat 26. The internal pressure at which the pressure valve member 42 opens can be determined by the adjustment of the nut 58. To maintain the compression nut 58 at a particular adjustment, lock nut 60 is tightened against the nut 58.

The pressure valve member 42 is preferably a frusto-conical shaped member which extends from a first wider end portion 62 to an opposite second narrower end portion 64, as shown in FIGS. 6 and 7. The pressure seal means 44 are located in the groove 43 adjacent to the first end 62 of the pressure valve member 42, the preferred seal means including an O-ring 66 which cooperatively and sealably engages the valve seat 26 on the body member 12 when closed. The pressure valve member 42 further includes an internal cavity 68 which is defined by a tapered annular surface 70 located adjacent to the first end portion 62, and a communicating cylindrical internal surface 72 located within the second end portion 64. A shaft receiving bore 74 in the member 42 receives the shaft member 30 which extends axially through the member 42. The member 42 also has a plurality of apertures 76 at angular spaced locations around the internal cavity 68.

The vacuum relief valve assembly 16 is located on the shaft 30 and extends into the cavity 68. The assembly 16 includes a valve member 78 located adjacent to the first end portion 62 of the member 42, as shown in FIG. 5.

The vacuum valve member 78 includes a seal or O-ring 80 positioned in a groove 81 which O-ring 80 cooperatively and sealably engages the internal tapered surface 70 on the pressure valve member 42. The vacuum valve member 78 receives and is axially movable on the shaft 30 to engage and disengage the seal means 80 with the internal tapered surface 70 of the pressure valve member 42 for closing and opening the vacuum relief vent passage 40. The assembly 16 is biased toward its closed position by spring 82 located on the shaft member 30 between the vacuum valve member 78 and a spring retainer or washer 84 which is engaged with the shaft support web 32 on the body member 12. The spring 82 is a compression spring which exerts its biasing force directly against the vacuum valve member 78 urging the seal means 80 into engagement with the surface 70 on the pressure valve member 42.

Another spring member 86 is also located on the shaft member 30 on the opposite side of the vacuum valve member 78 from the spring 82. The spring 86 is located in the cavity 68 of the pressure valve member 42, extending from the partly closed end of the cavity 68 to a spring retainer washer 88, and operates in opposition to the spring 82. Another seal such as O-ring 90 is located in sealed engagement with the shaft member 30 and is also in sealed engagement on its opposite sides with the washer 88 and the upper surface of the valve member 78 forming an airtight seal between the valve member 78 and the shaft member 30. Importantly, the spring 82 exerts a larger force against the vacuum valve member 78 than does the spring 86, but the spring 86 exerts sufficient force to maintain the O-ring 90 in contact with the vacuum valve member 78 as it moves axially along the shaft member 30 so as to maintain the airtight seal therearound and to prevent hysteresis in the movement of the vacuum valve member 78.

The vacuum valve member 78 is preferably a frusto conical shaped member as shown in FIG. 8 and is sized and shaped so as to be cooperatively receivable in the internal cavity 68 of the pressure valve member 42. The O-ring 80 is located in the annular groove 81 in the vacuum valve member 78, the O-ring 80 being cooperatively and sealably engaged with the internal tapered surface 70 of the pressure valve member 42 to form an airtight seal between the valve members 42 and 78 except under certain circumstances as will be described. The member 78 also includes an internal cavity 92 against which one end of the spring 82 abuts. The member 78 also has a shaft receiving bore 94 for receiving the shaft member 30. An important feature of the present construction resides in the fact that the vacuum valve member 78 is able to be receivable in the internal cavity 68 of the pressure valve member 42, and yet is able to move out of engagement with the member 42 to form a relatively large flow passage for the inflow of air if needed when it opens.

The present combination pressure and vacuum relief device 10 can be adjusted to open when the pressure in the container 37 reaches some predetermined first pressure and to likewise open again but in a different manner when the pressure in the container on which the valve is installed falls below some second predetermined vacuum pressure. For instance, in the cargo and transportation tank industry, pressure activated valves must typically be able to limit the over pressure in a container to about 3.0 pounds per square inch gage (P.S.I.G.) and reseat when pressure drops to 3.0 P.S.I.G. or below. The industry standard also typically requires in a vacuum relief or vent device a flow rate capacity of 1750 standard cubic feet per hour (S.C.F.H.) at 1.0 P.S.I.G. The present combination pressure and vacuum relief device 10 is able to be made and adjusted to meet both of these requirements.

The subject device is therefore able to relieve excess pressures in a container and by means which if necessary are able to establish a relatively large opening or passageway for the pressures to be relieved. This is important because it means that the pressures can be relieved in a relatively rapid manner so as not to damage the container or the valve. It is important to note that the pressures inside the container acts against the under surfaces of both of the assemblies 14 and 16. The pressure at which the valve assembly 14 moves out of engagement with the valve seat 26 can be accurately preset by proper selection of the spring members 46, 82 and 86. Also, when the pressure inside the container 37 falls below some predetermined pressure which can be accurately preset, again by the selection of the spring members 46, 82 and 86 the assembly 16 can move out of engagement with the assembly 14 providing a relatively large opening for air or other gases to enter through the valve into the container to prevent damage to the container due to excessive forces which otherwise might cause an implosion or collapsing of the container. It is also important to the present construction to provide the seal member 90 which seals the upper end of the assembly 16 against the washer 88 so that there will be no leakage thereby. This is important to the operator because it enables the device to be accurately preset so that it will operate at precise pressures both during opening of the pressure relief valve assembly as well as opening of the vacuum relief valve.

The present pressure and vacuum relief device can further be configured for venting and relieving at other pressure and vacuum conditions by the selection of appropriately sized components thereof including the springs. The pressure valve member 42 and the vacuum valve member 78 can have a variety of shapes for the outer surfaces and internal cavities thereof such as being made as segments of spheres, paraboloids, eliptoids and other curved shapes. The cover member 52 can also have a variety of shapes, as desired and the respective components can be fabricated from a variety of materials including stainless and carbon steels and other metals, plastics, poly vinyl chlorides and any other suitable material.

Thus there has been shown and described a novel combination in a single structure of a pressure and vacuum relief vent device which fulfills all of the objects and advantages set forth above. It will be apparent to those skilled in the art, however, that many changes, modifications, variations and other uses and applications for the subject invention are possible. All such changes, modifications, variations and other uses and applications which do not depart from the spirit and scope of the invention are deemed to be covered by the invention which is limited only by the claims which follow.

What is claimed is:

1. A combination pressure and vacuum relief vent apparatus for mounting in an orifice in a container comprising;

a body member having opposed end portions and a passageway extending therebetween, one of said opposed end portions including means for mounting the body member on the container adjacent to the orifice therein, the other of said end portions forming a valve seat, a shaft member mounted extending through the body member and through the passageway therein, a combination valve assembly mounted on the shaft member adjacent to the other end portion of the body member thereof, said combination valve assembly including pressure relief means which open in response to the pressure in the container reaching or exceeding a first predetermined pressure, said pressure relief means including first and second relatively movable members mounted on the shaft member, the first member having a valve portion sealably engageable with the valve seat on the other end portion of the body member and a second valve seat inwardly thereon, said second member having a valve portion sealably engageable with the second valve seat, means biasing the second member into sealed engagement with the second valve seat when the pressure in the container is above a second predetermined pressure, the second member acting against the biasing means and moving away from the second valve seat in response to the pressure in the container decreasing to or falling below the second predetermined pressure in the container to allow ambient air to enter the container therebetween, and seal means located on the shaft member adjacent to the second member and means biasing the seal means toward the second member to form a seal therebetween.

2. The combination pressure and vacuum relief vent apparatus of claim 1 wherein the valve portion of said first member engages the valve seat on the body whenever the pressure in a container is below the first predetermined pressure.

3. Means to prevent communication between the interior of a container and atmospheric condition when the pressure in the container is less than a first predetermined pressure and greater than a second predetermined pressure, the container including a closed wall structure with an orifice therein, the present construction comprising a valve assembly including a tubular member for mounting in the orifice in the container, said tubular member having an annular valve seat at one end, a shaft member mounted in the tubular member and extending therethrough, a first valve member mounted for movement axially on the shaft member, first spring means on the shaft member biasing the first valve member into closed engagement with the annular valve seat, said first valve member having a second annular valve seat thereon, a second valve member mounted for axially movement on the shaft member, second spring means on the shaft member in opposition to the first spring means biasing the second valve member into a position thereon in engagement with the second annular valve seat on the first valve member, the first valve member responding to pressures in the container in excess of a predetermined pressure in the container and in opposition to the biasing force with the first spring means to move the first valve member out of engagement with the annular valve seat to relieve the excessive pressure in the container, and a third spring member and associated seal means positioned on the shaft member adjacent to the second valve member to form a sealed condition therebetween.

4. The means of claim 3 wherein the second valve member moves out of sealed engagement with the second valve seat in opposition to the second spring means when the pressure in the container falls below some predetermined second pressure.

5. Apparatus for relieving excess pressure and vacuum conditions in a container having an opening therein comprising:
a tubular body member having opposing open end portions and a passageway extending therebetween, a first of said opposed end portions including means for attaching the tubular body to a container in position adjacent to the opening therein, and a valve seat on said tubular body member adjacent a second of said opposed end portions,
a shaft member and means in the passageway supporting the shaft member extending therethrough,
pressure relief means located adjacent to said second opposing end portion of said body member and vacuum relief means located adjacent to said pressure relief means and movable relative thereto, both said pressure relief means and vacuum relief means acting in concert to close said second opposing end portion of the body member when the pressure condition in the container is below a first predetermined pressure and above a second predetermined pressure, said pressure relief means including a first valve member movably mounted on said shaft member, said first valve member having a valve portion for sealable engagement with said valve seat on the tubular body member, a valve seat opposite said valve portion and first means biasing said first valve member into sealed engagement with the valve seat on the tubular body member, said vacuum relief means including a second valve member movably mounted on said shaft member and having a valve portion for engagement with the valve seat on said first valve member, second means biasing the second valve member into engagement with the valve seat on the first valve member, seal means mounted on the shaft member adjacent the second valve member and third means biasing the seal means toward the second valve member forming a seal between the shaft member and the second valve member, said first and second valve members having a side exposed to the pressure inside of the container through the passageway, pressure in the container operating against the side of the first and second valve members exposed thereto and in opposition to the first biasing means to move said first valve member out of sealed engagement with the valves eat on the tubular body member to open a pressure relief passage adjacent said second end portion of the body whenever the pressure condition in the container is at or above the first predetermined pressure, and pressure operating on the second valve member in opposition to the second biasing means to move the second valve member out of sealed engagement with the valve seat on the first valve member to open a vacuum relief passage adjacent to said second end portion of the body whenever the pressure condition in the container is at or below the second predetermined pressure.

6. In a device for relieving excessively high and excessively low pressures in a container having an orifice therein comprising a valve assembly having a body portion of tubular construction with a passageway extending therethrough, said body portion having one end for attaching to the container in communication with the orifice and an opposite end forming a valve seat,
means for mounting a shaft in the tubular member extending therethrough, first and second valve members mounted on the shaft said first valve member having a valve portion for sealable engagement with the valve seat on the body portion and a valve seat opposite thereto, the second valve member having a valve portion for engagement with the valve seat on the first valve portion, such of said first and second valve members having a side exposed to the pressure inside of the container through the passageway, means biasing said first valve member into sealed engagement with the valve seat on the body member, second means biasing the second valve member into engagement with the valve seat on the first valve member, and third means biasing including seal means mounted on the shaft member and forming a seal between the shaft member and the second valve member, pressure in the container in excess of some predetermined pressure operating against the side of the first and second valve members exposed to the pressure inside of the container to move the first valve member out of engagement with the valve seat on the body member to provide communication between the inside of the container and ambient atmosphere, pressures in the container below said second predetermined pressure operating on the second valve member in opposition to the second biasing means to move the second valve member out of sealed engagement with the valve seat on the first valve member, the area of the second valve member exposed to the pressure in the container being less than the areas of the first and second valve members exposed to the pressure in the container.

7. The device of claim 6 wherein the shaft member has a cup shaped cover attached thereto, said cup shaped cover extending to substantially enclose the first and second valve members and the adjacent end portion of the body member including the valve seat thereon.

8. The device of claim 6 wherein the first biasing means includes a first spring member mounted on the shaft member, said tubular body member including means to support the shaft member at an intermediate location in the passageway, said first spring member having a first end engaged with the support means and means threadedly engageable with the shaft member adjacent the end of the shaft member opposite from the first and second valve members, said first spring having a second end engaged with the means threadedly engageable with the shaft member.

9. The device of claim 6 wherein the second biasing means includes a spring member positioned on the shaft member between the shaft support means in the body portion and the second valve member.

10. The device of claim 6 wherein the third biasing means includes a third spring member positioned on the shaft member between the second valve member and the first valve member, said third spring member operating in opposition to the second spring member.

11. The device of claim 6 wherein the first valve member comprises a frusto conical shaped member having a cavity on one side for receiving the second valve member and the third biasing means.

12. A valve device for mounting in an orifice in a container to relieve excessive container pressures in a positive and a negative direction comprising a unitary valve device including means for mounting the valve device in the container orifice, said valve device including a tubular body portion having a first end located at the container orifice and an opposite free end defining a valve seat, means in the body portion forming a passageway therethrough, a shaft member mounted extending axially through the passageway having a first end extending into the container and an opposite end extending outwardly from the container, first and second valve members movably mounted on the shaft member externally of the container, said first valve member having a valve seal thereon in position to engage the valve seat on the body member and having a valve seat inwardly of the valve seal, said second valve member having a valve seal thereon positioned to engage the valve seat on the first valve member, first spring means on the shaft member for urging the sealing member on the first valve member into sealed engagement with the annular valve seat on the body member, second spring means on the shaft member for urging the valve seal member on the second valve member into sealable engagement with the valve seat on the first valve member, and the third spring member mounted on the shaft member in opposition to the second spring member, a sealing member positioned on the shaft member adjacent to the third spring member in position to engage the second valve member to form a seal between the shaft member and the second valve member, the combined area of the first and second valve members exposed to the pressure inside the container being greater than the area of the second valve member exposed to the pressure within the container in excess of a predetermined pressure will cause the first and second valve members to move in concert out of engagement with annular valve seat on the body member to provide relief for the pressure in the container, the second valve member moving out of engagement with the valve seat on the first valve member when the pressure in the container falls below some predetermined pressure relative to ambient pressure to provide a passage into the container for ambient air to relieve the reduced pressure condition therein.

13. The valve device of claim 12 including a cup shaped cover member attached to the free end of the shaft member and extending therefrom to enclose a space around by the first and second valve members.

* * * * *